United States Patent

[11] 3,586,972

| [72] | Inventor | Harry W. Tulleners |
| | | Urbana, Ohio |
| [21] | Appl. No. | 716,803 |
| [22] | Filed | Mar. 28, 1968 |
| [45] | Patented | June 22, 1971 |
| [73] | Assignee | Industrial Nucleonics Corporation |

[54] ELECTRICAL PROPERTY MONITORING PROBE WITH PNEUMATIC MEANS FOR MAINTAINING PROXIMITY OF PROBE TO MOVING SHEET MATERIAL
2 Claims, 5 Drawing Figs.

| [52] | U.S. Cl. | 324/61 |
| [51] | Int. Cl. | G01n 27/26 |
| [50] | Field of Search | 179/100.2; 340/174.1 E; 324/61 CP, 65 CP, 61 M, 65 M |

[56] References Cited
UNITED STATES PATENTS

| 1,946,924 | 2/1934 | Allen et al. | 324/61 UX |
| 2,718,620 | 9/1955 | Howe | 324/61 |
| 2,231,035 | 2/1941 | Stevens et al. | 324/61 |
| 2,997,649 | 8/1961 | Kotilainen | 324/61 |
| 3,418,434 | 12/1968 | Groenewegen | 179/100.2 |
| 3,421,077 | 1/1969 | Liu et al. | 324/61 |

OTHER REFERENCES

Cutaia et al. " Magnetic Head Assembly with Vacuum Pad." IBM TECHNICAL DISCLOSURE BULLETIN Vol. 4 No. 7 Dec. 1961. pp. 40— 41 (copy in class 179-100.2P)

*Primary Examiner*—Edward E. Kubasiewicz
*Attorneys*—Cushman, Darby & Cushman, William I. Fryer, III, C. Henry Peterson and James J. O'Reilly ABSTRACT: For monitoring the moisture content of strip material such as paper while it is being manufactured or wound, a dielectric gauge probe is provided including concentric, circular or spiral plates, adjacent circular plates or turns of spiral plates being of opposite polarity, the probe being arranged for edgewise presentment of the plates to the moving strip, a hood being provided about the plates. Negative air pressure maintaining apparatus is communicated to the interior of the hood, and through a passage in the probe to the strip of material for maintaining the probe in desired adjacency with a surface of the strip.

PATENTED JUN22 1971

3,586,972

INVENTOR

HARRY W. TULLENERS

BY Cushman, Darby & Cushman
ATTORNEYS

ELECTRICAL PROPERTY MONITORING PROBE WITH PNEUMATIC MEANS FOR MAINTAINING PROXIMITY OF PROBE TO MOVING SHEET MATERIAL

BACKGROUND OF THE INVENTION

It is well known that as a web of dielectric material passes between the plates of a capacitor which is interposed in a bridge circuit or other measuring circuit, variation in one or more properties of the web which affect the dielectric constant thereof, can be measured. Typical is the use of such a device to measure change in thickness or moisture content of a paper web during its production in paper mills, during rolling of the paper, or incident to a paper printing operation. The monitoring device may be used to provide control signals to upstream or downstream equipment for correcting the moisture content of the paper.

Capacitance measurement circuits are discussed, for instance, in "Standard Handbook for Electrical Engineers," 8th Ed., McGraw-Hill, New York (1949), Sections 3-250 through 268; 23-114.

In certain instances, electrical resistance or conductance of material has been monitored in a similar fashion, for instance see the U.S. Pats. of Strang et al. 2,217,626 and Jackson et al. 3,270,279. The latter, at column 6, lines 37—56, generally discusses the equipment differences between electrical resistance or conductance monitoring apparatus and dielectric constant monitoring apparatus.

The U.S. Pat. of Allen 1,946,924, shows a sheet thickness calipering device wherein a sheet of material is drawn between two plates connected in coupled, tunable electrical circuits. At least one of the plates comprises a centrally ported disc, positive fluid pressure being forced out through the port to cause the disc to float above the general contour of one surface of the sheet, apparently similarly to the manner in which hovercraft and other ground effects machines float over land and water surfaces.

It was early recognized that monitoring which required the presence of probe elements on both sides of the monitored material was a disadvantage which could be overcome by presenting the plates electrodes in edgewise fashion to the material, with guard means between the plates or electrodes, so that the current or field must pass from one plate or electrode edge to the other through the material. Devices of this type are illustrated in the commonly assigned, copending U.S. Pat. application of Evans, Ser. No. 585,381, filed Oct. 10, 1966; and in the U.S. Pats. of Peschl 1,623,436; Stevens et al. 2,219,497; Firestone 2,285,152; Howe 2,718,620; and Lippke 3,143,886; and in "Howe: Process Monitoring by Dielectric Constant," IRE Transactions on Industrial Electronics, Apr. 1958, pp. 61—63.

Such probes, when in actual physical contact with the moving sheet of material, provide readings less distorted by variable edge leakage between electrodes. However, since marring of the engaged surface of the sheet material must be avoided, the probe must be able to withstand abrasive characteristics of the sheet material, must not interfere with the winding tension on the sheet sufficiently to cause wrinkling, skewing, or other damage to the sheet material.

For a radio frequency measurement, it is not necessary to have actual physical contact between the probe electrodes and the paper, provided that the paper rides very close to the probe and is kept at a constant distance from it.

Where a moving sheet of paper is measured, the physical contact between the paper and the electrodes is normally poor due to the roughness of the paper, even when contact is apparently being made. There is thus effectively a gap between each probe electrode and the paper. Associated with this gap is a "coupling capacitance" in series with the probe and the paper. Some of the electric field lines pass through the paper and traverse a gap on the back side of the paper, and the effect of this gap is also associated with the "coupling capacitance." One effect of "flutter," that is, changes in the distance between between the paper and the electrodes, is to change the magnitude of the coupling capacitance, and this is one way in which flutter affects the measurement.

The meaningful "paper inpedance" which is measured by probes of the type with which the invention is concerned, is associated with the distribution of the electric field lines within the paper itself. If the flutter is great enough to significantly change the field distribution within the paper, it results in a further deterioration in the quality of the measurement. Furthermore, the probe must run free of debris buildup such as would produce false readings and not be so susceptible to static charge buildup on cold, dry days as the probe rubs the sheet material that shock damage to sensitive elements of the measuring circuits will occur.

In the monitoring of certain properties, such as moisture content of a paper web, a further difficulty is presented in that the water present collects in the fine cellular structure of the fibers.

Experiments conducted by Industrial Nucleonics Corporation using flat, parallel plate-type spray field capacitor electrodes indicate that the angular orientation of the probe about the axis normal to the paper web faces often affects the reading provided by the probe, indicating anisotropic moisture content and/or difference in effectiveness of obtaining a reading by the probe from the web depending on the orientation thereof. Anisotropism can to some extent be taken into account by presenting several probes to the web, oriented at various angles thereto. However, in compiling and analyzing the various probe readings, it is difficult to ensure that all of the probes are monitoring the same region of the web, or are monitoring with equal efficiency. In any event, multiplication of the necessary number of components adds to capital and maintenance costs and increases attendant tasks such as prevention of web surface marring by the probes.

SUMMARY OF THE INVENTION

Recognizing that prior art probes have not been free of deficiencies in one or more of the aforementioned aspects, the present invention provides in one specific embodiment a probe for presentation to one side of a moving strip of material for measuring an electrical characteristic thereof, which probe includes parallel concentric circular or spiral fringe field plates or electrodes, and a hood thereover. For achieving the desirable conditions of having the paper as close to the probe as possible without marring the surface of the paper and to keep it at a constant distance therefrom, the paper is maintained proximate the probe electrodes, including nominally in physical contact with the probe electrodes. This is best done by using pneumatic pressure against one side of the paper in a sense to create a pressure imbalance on the paper to force the paper proximate or against the electrodes. While actual probe/paper contact is preferred according to the primary embodiment of the invention when the probe is connected in a measuring circuit measuring in the radio frequency range, the probe, if proximate the paper though not against the paper, will provide a satisfactory reading provided the gap remains constant and is very small.

The one-side probe is capable of providing resistance and capacitance measurements while lightly engaging the strip material surface, so as to obtain an accurate reading without marring the surface or interfering with winding of the strip; of running relatively free of debris, since the same is whisked away. The one-side probe is also capable of running relatively free of potentially damaging static charge buildup, and of providing an accurate average measurement of an electrical property that is anisotropic respecting a face of the strip of material.

The terms "sheet," "strip" and "web" as used herein are not intended to distinguish particular dimensions or dimension ratios of bodies of material. The probe of the invention can be presented against surfaces of many kinds of material for electrical property measurement, exemplified by but not limited to those materials disclosed in the prior patents mentioned hereinabove, and in the copending commonly assigned U.S. Pat. application of Evans, Ser. No. 585,381, filed Oct. 10, 1966. However, for simplicity, the discussion of the invention will be related herein to moisture content monitoring of a paper web during manufacture thereof.

The principles of the invention will be further hereinafter discussed with reference to the drawings wherein preferred embodiments are shown. The specifics illustrated in the drawings, unless otherwise indicated, are intended to exemplify, rather than delimit, aspects of the invention as defined in the claims.

DESCRIPTION OF PREFERRED EMBODIMENTS

Figure 1:
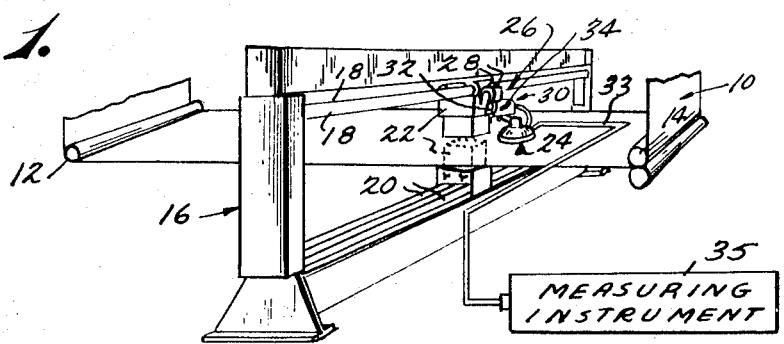
FIG. 1 is a perspective view of an intermediate portion of a paper making operation, showing a paper sheet undergoing measurement by gauging apparatus including a probe of the present invention.

In FIG. 1, a web 10 of paper is shown passing horizontally, rightwardly, tensioned between rolls 12, 14. As an indication of scale, the width of the web is, for instance, 12 feet, and the unsupported length, between the rolls 12, 14, for instance, 10 feet.

Intermediate the rolls 12, 14, the web 10 path of travel is transversely straddled or circumscribed by a wide "0" frame 16, having parallel upper and lower rails 18, 20 which mount a nucleonic radiation source and detector unit 22 for automatic monitoring and control of basis weight of the paper. The unit 22 mounted for remote control movement transversely of the web on the rails 18, 20 does not form a part of the present invention, but merely provides a convenient support for the new probe 24.

The probe 24 is shown attached to the housing of the unit 22 as a downstream outrigger, via a lift-off mechanism 26. The lift-off mechanism includes a pair of inverted "J" brackets 28 height-adjustably mounted on the housing of the unit 22 so as to have the long leg of each directed vertically downwardly. A probe lift-off mechanism housing 30 is mounted via connectors 32 on the brackets 28. The lift-off mechanism housed at 30 is constructed and arranged to lift the probe 24 up away from the web 10 when the nucleonic radiation gauge periodically goes transversely out of vertical adjacency with the web 10 for gauge standardization and to lower the probe back toward the web when the gauge comes back on the web. The flexible plastic tube 34 carries compressed air for actuating a pneumatic piston and cylinder type arrangement (not shown) within the housing 30 for effecting the raising and lowering of the probe 24. The probe is electrically coupled via one or more cables as indicated at 33 to a suitable measuring instrument 35 which may be of the type described in the Baird U.S. Pat. No. 3,241,062.

The particular lift-off mechanism 26 may be of the type shown and described in the Bach et al. U.S. Pat. No. 3,369,408 and is not a part of the present invention, nor an essential adjunct to the successful use of the probe of the present invention; it comprises a preferred support and is also shown or described in the above-mentioned Evans application Ser. No. 585,381 (FIG. 8).

Figure 2:
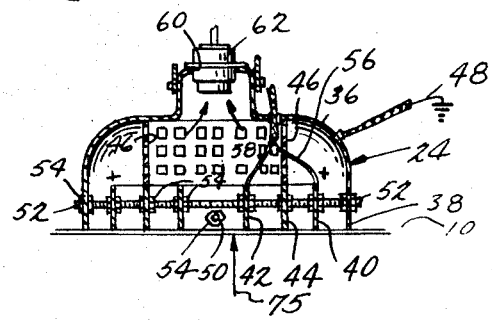
FIG. 2 is a vertical sectional, somewhat schematic view of the new probe.
Figure 3:
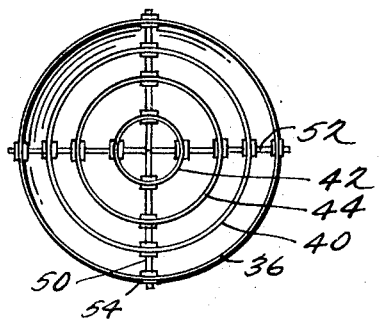
FIG. 3 is a bottom plan view of the probe of FIG. 2.

A probe 24 constructed according to the principles of the invention is shown schematically in FIGS. 2 and 3. This probe includes a housing 36, generally resembling a lampshade, the housing being generally circular in horizontal cross section and being open at the lower edge 38 thereof. Within the housing 36, having their lower edges flush with the housing lower edge 38, are concentric tubular positive and negative electrodes 40, 42 blinded from one another by a tubular guard 44 having its lower edge flush with or slightly above the housing lower edge. The guard is concentric with and spaced from the electrodes 40, 42. The guard and electrodes are substantially circular in horizontal cross-sectional shape. The guard 44 is electrically connected to the housing 36 via means such as wires or a foraminous grid 46, so as to be at the same potential as the housing 36, i.e. ground, 48.

In the embodiment of FIGS. 2 and 3, the electrodes 40, 42 and guard 44 are maintained in concentric, spaced relationship with respect to one another and to the housing 36 by two horizontal, diametrically directed rods 50, 52, mounted on the housing 36 a short distance upwardly from the lower edge 38 thereof so as to extend at right angles to one another. The rod 50 is positioned somewhat lower than the rod 52 so that the rods are vertically spaced from one another at their crossing point at the center of the housing 36. The rods 50 and 52 are exteriorly threaded throughout their respective lengths and the electrodes 40, 42 and guard 44 are each provided near their upper extent with openings for receiving the respective rods 50, 52. Similar openings are formed in the housing 36. The rods 50, 52 inserted through these openings, are secured to the electrodes 40, 42, guard 44 and housing 36 by locknut assemblies 54.

The rods 50 and 52 are preferably somewhat flexible so that upon lifting of the probe, rods flex lowering the electrodes a little. As the probe is lowered, force of the paper against the electrodes pushes them upward. The rod flexibility ensures better electrode/paper contact to dampen the effects of bouncing of the probe and undulation of the paper web. Of course, a greater number than two rods 50, 52 may be provided, all axially and/or angularly spaced from one another.

The rods 50, 52 may comprise insulating material, for instance, being of metal with a ceramic covering. Alternatively, or in addition, the locknut assemblies may include insulating spacers for insulating the respective rods from the electrodes, guard and housing. Electrical connection to the electrodes 40, 42 is shown provided by insulated electrical conductors 56, 58. However, it should be recognized that the rods 50, 52 could be made of electrically conductive material. The locknut assemblies 54 connecting one of the electrodes to one of the rods being made of conductive material and the locknut assemblies connecting the other electrode to the other rod being made of electrically conductive material and all of the remaining locknut assemblies including insulating spacers. In the latter instance, the conductor 56 can be connected to one of the rods exteriorly of the housing 36 and the conductor 58 connected to the rod 52 exteriorly of the housing 36.

The conductors 56, 58 lead to a conventional balanceable, electric circuit as unknown resistance and/or unknown spray field capacitance input to the balanceable electrical circuit.

The probe housing 36, above the electrodes 40, 42 is seen to have a small opening 60 in which is mounted a suction blower 62, preferably of the centrifugal type. Alternatively, the blower 62 can be mounted elsewhere than on the housing 36 and communicated to the interior of the housing 36 through the opening 60 by a suitable conduit such as a flexible plastic tube. Since the probe 24 preferably bears against the paper with a total pressure of no more than approximately 2—4 pounds, any excess weight must be counterbalanced at the probe lift-off mechanism. However, the probe should be as light in weight as possible in order to minimize the weight which must be counterbalanced. The greater the counterbalanced weight, the less rapid will be the reaction of probe. Accordingly, it can be seen that it will often be advantageous to mount the blower remotely from the housing and communicate suction side of the blower to the interior of the housing by a conduit entering through the opening 60 as aforementioned.

The pressure imbalance or suction created by the blower 62 is preferably great enough to lower the pressure within the housing 36, below atmospheric pressure by about one-tenth pound per square inch.

In use, the probe 24 bears lightly against the web 10. The suction created by the blower 62 is communicated to the paper in the annuluses between the electrodes, guard and housing peripheral wall, maintaining the paper in contact with the probe in spite of the long unsupported run of the paper web between the rolls 12 and 14.

The circular electrodes and guard assist in evening out the suction pressure over the whole area of the interface of the probe and paper web. The evenness of suction contributes to a very low incidence of probe induced flutter of the paper web. An even greater balancing of the probe/paper contact pressure throughout the interface may be provided by supporting the probe at points on a horizontal transverse axis slightly offset axially of the paper web travel path from the center of gravity of the probe and/or slightly offsetting the entrance of the suction tube or blower from coaxiality with the electrodes, the amount of offset being empirically determined, since it will vary in dependence upon surface roughness of the paper web, probe/paper contact pressure and paper web travel speed.

Figure 4:
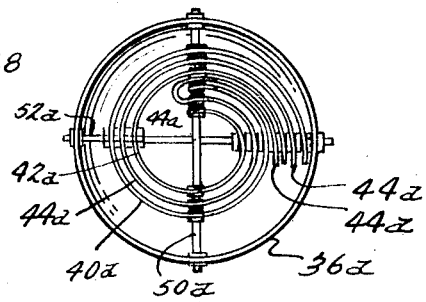
FIG. 4 is a bottom plan view of a probe similar to that of FIG. 2, but having spiraled electrodes separated by a spiraled guard.

Another example of a probe of the present invention is illustrated in FIG. 4 wherein elements corresponding to those of the probe of FIGS. 2 and 3 have been similarly numbered, but suffixed with an "a." Basically, the circular electrodes and guard of the probe of FIGS. 2 and 3 have been replaced by coaxial spiral electrodes 40a, 42a and guard 44a which are generally angularly coextensive and proceed through at least one complete turn. As shown, the guard 44a is slightly more angularly extensive than the electrodes in order to ensure complete shielding. The number of turns of the electrodes and guards may be greater than that depicted. The probe of FIG. 4 may be used in substantially the same manner as the probe of FIGS. 2 and 3 and retains the advantages thereof.

Figure 5:
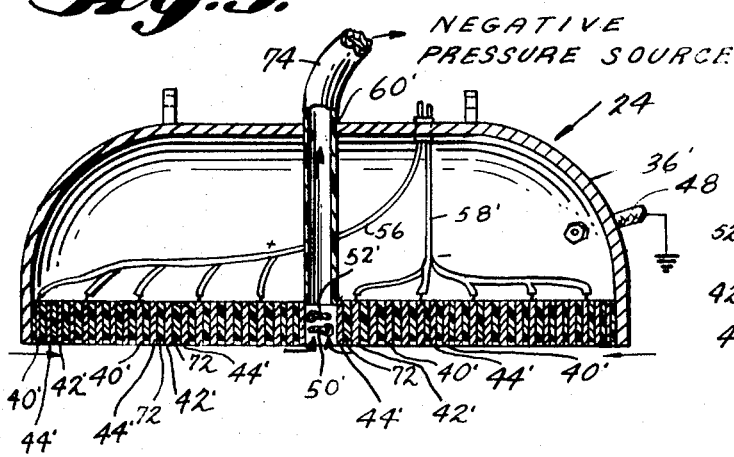
FIG. 5 is a vertical sectional view of a probe similar to that of FIG. 2, showing a typical configuration.

A further example of a probe of the present invention is illustrated in FIG. 5. In the probe 24', the rods 50', 52' mount a plurality of concentric electrodes 40', 42'. Although five pair of electrodes are illustrated, more or less electrode pairs could be provided. The guards 44' are grounded via their connection to one or both of the rods 50', 52', by conducting locknuts (not shown).

In the embodiment of FIG. 5, with the exception of the bore 70 of the radially innermost electrode, the annuluses between the electrodes, guards and housing peripheral wall are filled with a potting compound 72. Since the potting compound is a dielectric material, it is recessed 0.030—0.100 inch from the respective lower edges of the electrodes, guard and housing in order to prevent the buildup of static electric charge which would result from rubbing of the paper web by the potting compound. Recessing of the potting compound also provides for wear of the electrodes, guards and housing lower edges. A flexible tube 74 enters the housing 36' through the opening 60' and terminates in the bore 70 of the radially innermost electrode. The tube 74 is made of electrically insulating material and has the opposite end thereof communicated to a source of negative air pressure, such as a suction pump line, and thus provides a pressure imbalance in a sense to force the paper proximate or against the probe. In use, the probe 24' would be mounted, for instance, as discussed above in respect to the probe 24, shown mounted in FIG. 1. The electrodes 40' and 42', guards 44' and potting compound-filled regions 72 may be spiral rather than circular, substantially as described herein in respect to the probe 24a of FIG. 4.

In the following discussion, there are given several examples of sizes and materials for the probes of FIGS. 1—5, which should be understood as exemplary rather than limitative. The electrodes are preferably made of very hard conducting material such as abrasion resistant, metal filled ceramic, although in certain instances other materials such as stainless steel can be used. The housings 36, 36a, 36', which can also be characterized as hoods or shields, can each be formed as a unit, for instance from cast aluminum.

Although the probes of FIGS. 2—4 are shown having no potting compound between the adjacent electrodes, guard and housing, potting compound can be employed in the annuluses as discussed above in relation to the embodiment of FIG. 5, provided a plurality of openings are made through the potting compound for communication of the suction provided by the blower 62 to the paper web 10, distributed over the lower surfaces of the probes 24, 24a. In place of conventional, cross-linking potting compound, Teflon or glass wool filled potting compound may be used.

The cross-sectional area of each probe 24, 24a, 24' at the level of the electrodes thereof, may be, for instance, 25 square inches. Rather than being strictly flat, the lower surface of the probe 24, 24a or 24' may be machined so as to have a slight curvature, for instance, about a horizontal axis transverse to the path of the paper web 10, having a radius of approximately ten feet. This slight curvature is advantageously used if there is a slight dip in the paper web 10 between the rolls 12 and 14 because of the length of the unsupported portion of the web extending between the rolls 12 and 14.

When the paper 10 is relatively lightweight, the supportive effect of the probe 24, 24a or 24' is often enough to counteract the tendency of the paper to dip between the rolls 12 and 14 so that no curvature need be provided on the lower surface of the probe 24, 24a or 24' in such instances.

The electrodes 40, 42, 40a, 42a and 40', 42' provide more accurate readings since they serve to evenly distribute the pneumatic pressure within the housing and because they lack sharp corners, having better riding qualities on the web so as to cause less damage to the surface of the paper. In addition, the negative pressure communicated to the disc shaped area between the probe and the upper surface of the paper web aids in removing debris from this area. It has been the experience with certain conventional moisture content monitoring content probes that buildup of debris at the lower edges of the electrodes has caused distortion of the reading provided thereby when heavily coated paper was being monitored.

Although the readings obtained with the circular or spiral electrodes will be influenced by the orientation of the fibers, the influence of any orientation is the same, and thus consistent measurements should be obtained even if the fiber orientation changes.

Maintaining of the web 10 proximate, including very close to and nominally against, the lower edges of the electrodes of the probe 24, 24a or 24' can be accomplished by or assisted by the application of a positive pneumatic pressure to the web from its underside at a point in vertical alignment with the probe 24, 24a or 24' as exemplified by the arrow 75 in FIG. 2. This also creates a pressure imbalance in a sense to force the paper proximate, including very close to and nominally, against the probe.

It should now be apparent that the electrical property monitoring probe with pneumatic means for maintaining proximity of probe to moving sheet material as described hereinabove possesses each of the attributes set forth in the specification under the heading "Summary of the Invention" hereinbefore. Because the electrical property monitoring probe with pneumatic means for maintaining proximity of probe to moving sheet material of the invention can be modified to some extent without departing from the principles of the invention as they have been outlines and explained in this specification, for instance by providing other configurations of parallel electrodes on the probe, the present invention should be understood as encompassing all such modifications as are within the spirit and scope of the following claims.

I claim:

1. A one-side dielectric guage probe for monitoring the moisture content of a travelling web of material, comprising:
    a plurality of coaxial, spiral fringe field capacitor plates each having an edge presented downwardly, each plate being curved about a vertical axis and extending angularly throughout at least 360° about that axis;
    guard means received between the plates to separate the faces of adjacent plates from one another;

a downwardly open housing received over the plates and guard means;

mounting said plates and said guard means in radially spaced, noncontacting, mutually coaxial relationship with the lower edges of said plates all being substantially level with respect to one another and the lower extents of the guard means and the housing being no lower than the lower edges of said plates; and a negative pneumatic pressure source means communicated through the interior of the housing, above the plates, and among the plates to the web for pulling the web against the probe and for sucking away debris which could otherwise build up between the probe and the web, said negative pressure source means, when the web is pulled against the probe, maintaining a pressure imbalance of about one-tenth pound per square inch below atmospheric pressure.

2. The probe of claim 1 wherein the means mounting said plates and said guard means comprises a plurality of rods extending diametrically of and being secured to the housing, the rods being spaced axially and angularly of the housing longitudinal axis from one another; and means securing the plates and the guard means to the rods, the rods being exteriorly threaded and the means securing the plates and the guard to the rods comprising means defining lateral openings through the plates and guard, said rods being received through said lateral openings, and stop nuts threadably received on the rods adjacent each side of each plate and guard lateral opening.